United States Patent [19]

Stratienko et al.

[11] 4,367,053

[45] Jan. 4, 1983

[54] CLAMPING DEVICE

[76] Inventors: Andrew Stratienko, 8503 Elliston Dr., Philadelphia, Pa. 19118; Philip Trainer, 237 Highland Ave., Devon, Pa. 19333

[21] Appl. No.: 957,800

[22] Filed: Nov. 6, 1978

[51] Int. Cl.³ .............................................. F16B 2/14
[52] U.S. Cl. ................................... 403/371; 403/374
[58] Field of Search .............. 403/368, 369, 370, 371, 403/16, 356, 374, 376, 314

[56] References Cited

U.S. PATENT DOCUMENTS

| | | | |
|---|---|---|---|
| 2,612,395 | 9/1952 | Russell | 403/370 |
| 2,691,541 | 10/1954 | Benedek | 403/370 |
| 2,816,452 | 12/1957 | McCloskey | 403/369 X |
| 2,946,611 | 7/1960 | Moyer | 403/356 |
| 2,998,731 | 9/1961 | Renner | 403/370 X |
| 3,368,834 | 2/1968 | Strafienko | 403/352 |
| 3,501,183 | 3/1970 | Stratienko | 403/371 X |
| 3,638,974 | 2/1972 | Stratienko | 403/371 X |
| 3,656,785 | 4/1972 | Lothar | 403/371 X |
| 3,849,015 | 11/1974 | Peter | 403/370 |
| 3,958,888 | 5/1976 | Mullenberg | 403/13 |

FOREIGN PATENT DOCUMENTS

| | | | |
|---|---|---|---|
| 272852 | 7/1965 | Australia | 403/369 |
| 2301837 | 7/1974 | Fed. Rep. of Germany | 403/370 |

OTHER PUBLICATIONS

Advertisement Pamphlet for Posit-Grip Rings by Posit-Grip Corp., NWP-5-2/75.

*Primary Examiner*—Andrew V. Kundrat

[57] ABSTRACT

Disclosed is an improved clamping device for keyless mounting of a hub on a shaft of the type comprising an inner wedge ring having a cylindrical inner surface for gripping the shaft when contracted and an outer wedge ring having a cylindrical outer surface for gripping the bore surface of the hub when expanded. The pair of wedge rings have interracting annular surfaces with matching shallow-angle tapers and at least one has a stable dry anti-friction material coated thereon. The pair of wedge rings placed in the annular space between the hub and shaft are engaged with axial force means to cause the outer wedge ring to expand and the inner wedge ring to contract and thereby lock the hub to the shaft. The improvement is each of the wedge rings being provided by an equal number of a plurality of circumferential sectors separated from each other by a rotational stop member to provide maximum rotational securement of the hub to the shaft and substantially reduced circumferential deflection of the wedge rings under load.

25 Claims, 12 Drawing Figures

CLAMPING DEVICE

BACKGROUND OF THE INVENTION

1. Field of the Invention

The present invention relates to a clamping device for keyless mounting of a hub to a shaft. More specifically, the invention is a device comprising a pair of wedge-shaped clamping rings positioned in the annular space between the shaft and the hub and is an improvement to the device disclosed in U.S. Pat. No. 3,501,183 to Andrew Stratienko.

2. Description of the Prior Art

A number of hub-to-shaft connecting devices exist which employ some form of clamping rings placed in the annular space between the hub and the shaft. Such devices are useful for connecting the hub to the shaft without the use of keys in either the hub or shaft. A particularly satisfactory device of this type, disclosed in the above-mentioned patent, employs a pair of nesting wedge rings. The inner wedge ring has a cylindrical inner surface for gripping the shaft, and the outer wedge ring has a cylindrical outer surface for gripping the inner surface of the hub bore. The interacting surfaces of the wedge rings are provided with matching shallow-angle annular tapers, and at least one of them is provided with a stable, dry anti-friction material, such as Teflon, preventing metal-to-metal contact between the rings.

The device includes axial force means for forcing one wedge ring into engagement with the other wedge ring, thereby contracting the inner ring tightly about the shaft and expanding the outer ring into tight engagement with the hub bore.

The wedge angle and magnitude of coefficient of friction on the ring surfaces has such interrelation as to provide a self-locking action in the rings. Self-locking results when the axial component of force exerted on one of the wedge rings by the other wedge ring when forced into engagement is less than the frictional force between the cylindrical surfaces of the wedge rings and the shaft or hub, whichever it engages, so that by increase of axial force further engagement occurs rather than the rings sliding on the smooth surfaces of the shaft or hub.

The preferred embodiment of the locking device is also self-releasing, which means that the wedge rings automatically disengage from each other when the axial force is relaxed. Self-releasing results when the radial force exerted by the contracted inner ring and the expanded outer ring on each other has an axial component of force which is large enough to disengage the wedge rings when the axial engaging force is relaxed. By proper selection of the taper angle, the anti-friction material, and the straight cylindrical surface frictional characteristics of the wedge rings, the clamping device can be designed to be both self-locking and self-releasing. Such design considerations are described in detail in the above-mentioned U.S. Pat. No. 3,501,183, which is herein incorporated by reference.

Although the axial clamping device embodiments of U.S. Pat. No. 3,501,183 are capable of producing extremely large locking forces between the hub and shaft in the axial direction, the unmodified form does not provide good rotational locking. A modified embodiment of this axial device employs a key placed in matching slots of the inner and outer wedge rings to increase the rotational locking force between the two wedge rings. But this embodiment permits only partial use of the rotational gripping capacity of the clamping device designed within practical limits of size.

The rotational gripping capacity between the inner ring and the shaft and between the outer ring and the hub are much higher than the rotational gripping capacity on the slippery surfaces between the wedge rings, even with a key placed between the rings. Since very little rotational gripping action results between the slippery tapered surfaces of the wedge rings, the key must take most of the rotational force transmitted. However, the rotational force transmitted by the key stresses the contact surfaces and body of the rings over their entire annular circumference, and since the rings are thin and have large circimferential lengths, their capacity is small and circumferential deflection is big. Their capacity can be increased by increasing the ring thickness, but it is undesireable to increase the size of the annular space between the hub bore and the shaft for a number of obvious reasons, one of which is that increasing the hub bore results in a weaker hub and limited use of the device to only the large diameter hubs.

Additional problems exist in the use of a key for a rotational stop between a pair of wedge rings. In particular, the expansion and contraction of the wedge rings results in the key slots either becoming wider than the key or closing up to grip the key so tightly that it restricts free engagement of the rings. When the key slots open up, backlash develops which prevents reversal loading or accurate "timing" applications.

SUMMARY OF THE INVENTION

It is an object of the invention to provide a clamping device for securing a hub to a shaft which is improved to provide increased torsional capacity of the clamping device without increasing (and preferably decreasing) the required annular space between the hub shaft.

It is a further object of the invention to provide an improved clamping device with elimination of excessive backlash between the wedge rings due to clearance between the rotational stop member and the rotational stop slots in the rings.

It is a further object of the invention to provide an improved clamping device in which the axial force means also perform the function of the rotational stop means and eliminate the need for drilling and tapping either the hub or shaft.

These and other objects are provided by the invention, which in its broadest form is an improvement to a clamping device for keyless mounting of a hub on a shaft, which comprises a nesting pair of radially flexible wedge rings for placement within the annular space between the hub bore and the shaft and axial force means for forcing the wedge rings into nesting engagement to thereby radially expand one of the wedge rings and radially contract the other wedge ring. The pair of wedge rings is provided by an inner wedge ring having a cylindrical inner surface for gripping the shaft when contracted and an outer wedge ring having a cylindrical outer surface for gripping the bore surface of the hub when expanded. The inner wedge ring has an outer annular surface and the outer wedge has an inner annular surface with matching, shallow-angle axial tapers for nesting the inner wedge ring within the outer wedge ring, and at least one of the matching tapered surfaces has coated thereon a stable, dry anti-friction material preventing metal-to-metal contact. The angle of the matching tapered surfaces and the interrelation of coefficients of friction on the cylindrical and tapered surfaces of the wedge rings provides self-locking, and preferably self-releasing of the wedge rings.

The improvement comprises each of the inner and outer wedge rings being provided by an equal number of a plurality of connected circumferential sectors with each sector of the inner wedge ring aligning circumferentially with a sector of the outer wedge ring, and each pair of aligned sectors are separated from the adjacent pair of aligned sectors by a common rotational stop member. Each circumferential sector transmits only part of the rotational force between the wedge rings to thereby provide maximum rotational securement of the hub to the shaft and substantially reduced circumferential deflection of the wedge rings under load.

To illustrate the advantages of the invention, the rotational forces and ring deflections will be considered for an embodiment having each wedge ring provided by two circumferential sectors of equal size. The total rotational force between the wedge rings is divided equally between the two sectors, providing a stress of only one-half that which would occur with use of the prior art rings. Moreover, the circumferential length of each sector, being one-half as long, is subjected to only one-half the rate of deflection for any given stress. Therefore, the actual deflection of the wedge ring is reduced to one-fourth by dividing the ring into two sectors. An even more dramatic reduction in circumferential deflection can be realized by dividing the ring into more sectors. For example, four sectors will reduce the deflection to one-sixteenth.

In a preferred embodiment of the invention, the improvement employs axial force means which also perform the function of the rotational stop means for preventing rotation of one wedge ring with repect to the other wedge ring under load. In this embodiment, the axial force means are provided by a plurality of bolts, threaded means associated with the bolts, and an opening for each bolt formed by a pair of aligned axial grooves in the matching tapered surfaces of the rings. Each bolt passes through one of the openings to force the wedge rings into engagement in response to tightening of the bolt in the threaded means, and it also prevents relative rotation between the wedge rings by acting as a rotational stop.

In a more preferred form of the invention, only a single pair of inner and outer wedge rings is employed, and the axial force means fits entirely within the annular space between the hub bore and the shaft. The single pair of wedge rings are self-centering and are capable of providing the advantages of the present invention, in contrast to the prior art forms which employ two pairs of wedge rings with attendant complexity for centering them and do not employ bolts for rotational stop means.

More preferred embodiments of the invention provide modifications to the rotational stop slots which separate adjacent circumferential sectors of each ring to provide a tight fit against the rotational stop member after the wedge rings are pressed into complete engagement in the annular space between the hub bore and the shaft. The embodiments are more fully described in the detailed description of the invention and in the claims.

DETAILED DESCRIPTION OF THE PREFERRED EMBODIMENTS

Figure 1:
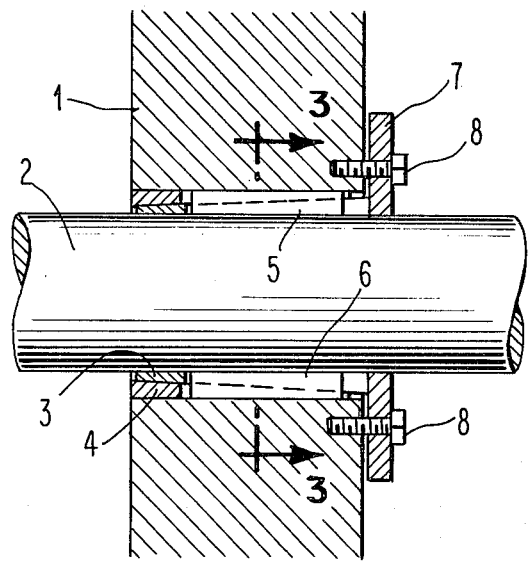
FIG. 1 is a sectional view of one embodiment of the clamping device of the invention shown installed in the bore of a hub mounted on a shaft through use of hub attachment means.

The clamping device of the invention is illustrated in FIG. 1, where the hub 1 of a gear, cam, bearing, pulley or the like, is mounted on a shaft 2 and secured by the inner wedge ring 3 and outer wedge ring 4. The wedge rings 3 and 4 are desired to be self-locking and preferably self-releasing and have coated on at least one of their interacting wedge surfaces a stably dry anti-friction material which prevents metal-to-metal contact.

When installed, the inner wedge ring 3 is contracted tightly against the shaft 2, and the outer wedge ring 4 is expanded tightly against the bore surface of the hub 1. The wedge rings 3 and 4 have slots in which rotational stop members 5 and 6 are installed to resist rotational movement between the wedge rings 3 and 4. The wedge angle of the rings 3 and 4 is very shallow, for example from 2° to 10°, and each wedge ring 3 or 4 provides a very high gripping capacity between itself and it respective member, the shaft 2 or the hub 1. Through use of the special design considerations discussed above and further discussed below, the rotational stop members 5 and 6 provide rotational locking strength between the rings 3 and 4 sufficiently high to utilize the maximum gripping strength developed between the rings 3 and 4 and the shaft 2 and hub 1. Furthermore, rotational backlash on tapered surfaces is sufficiently minimized in reversal loading applications and provides for accurate "timing" application.

The wedge rings 3 and 4 are installed by forcing one wedge ring into engagement with the other by the axial force means provided by annular flange 7 and the plurality of screws 8. Flange 7 fits over shaft 2 and engages the end of inner wedge ring 3, which extends beyond the corresponding end of outer wedge ring 4 and the hub 1 before the rings are pressed into engagement. Spaced around the flange 7 in a balanced arrangement are a plurality of openings through which screws 8 pass. Screws 8 engage corresponding tapped and threaded holes in the end of hub 1. When screws 8 are screwed into the hub 1, they force hub 1 with ring 4 toward flange 7 and thereby force outer ring 4 into engagement with inner ring 3. Further tightening of screws 8 causes further expansion of outer ring 4 and further contraction of inner ring 3, and thus, greater securing of the hub 1 to the shaft 2.

Figure 2:
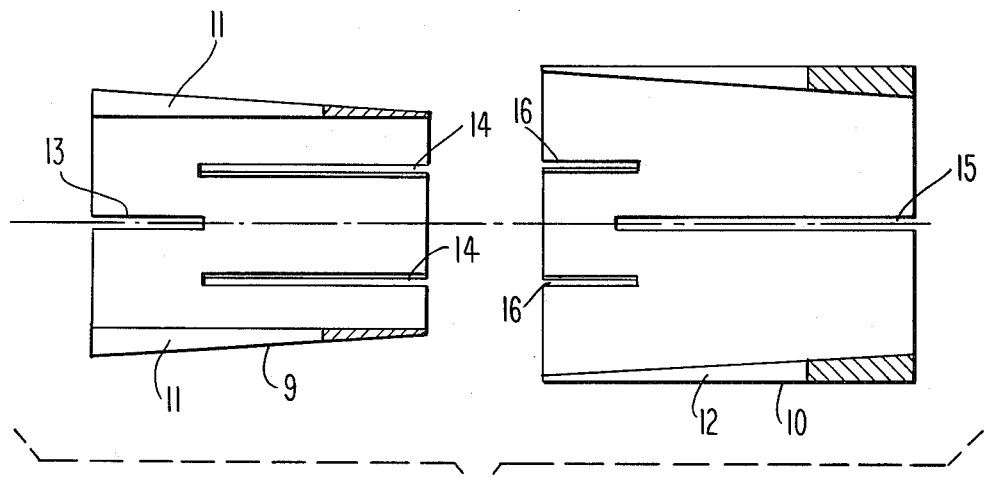
FIG. 2 is an exploded sectional view of one embodiment of the wedge rings shown in FIG. 1.

The special design considerations of the wedge rings can best be understood by referring to FIG. 2, which illustrates one embodiment of the wedge rings useful in the device of FIG. 1. Inner wedge ring 9 and outer wedge ring 10 are each shown with slots 11 and 12 extending part way through the length of the ring and leaving a web beyond the end of the slot to hold the ring sectors together and provide sufficient strength to transmit the force between adjacent sectors. Within the slots 11 and 12 are placed the rotational stop members like the members 5 and 6 illustrated in FIG. 1.

In addition to the rotational stop slots 11, inner wedge ring 9 has resiliency slots 13 and 14 positioned around the circumference of the ring 9 in a balanced arrangement and extending partially through the length of the ring. By balanced arrangement, it is meant that the resiliency slots are positioned so that the ring expands and contracts radially without circumferential displacement. The length of resiliency slots 13 and 14 is preferably such that the slots 14 from one end overlap with the slots 13 from the other end to provide a large degree of radial flexibility over the entire length of the ring 9. On the other hand, it is necessary that the resiliency slots 13 and 14 do not extend entirely through the length of the ring 9 in order to provide sufficient web to withstand the circumferential forces transmitted between adjacent segments. The web at this point is the remainder of the ring body left where the resiliency slot stops.

Outer ring 10 has resiliency slots 15 and 16 positioned around the circumference of the ring 10 in a balanced arrangement like those of inner wedge ring 9. The wedge rings 9 and 10 could be designed without the resiliency slots 13, 14, 15, and 16, since the thin walls of the rings permit some radial flexibility by mere expansion and contraction of the ring walls under the very high forces exerted when the rings are forced into engagement. However, the resiliency slots provide a valuable function in utilizing the rotational stop means and liberalization of clearances between cylindrical surfaces of rings and shaft and hub.

Figure 3:
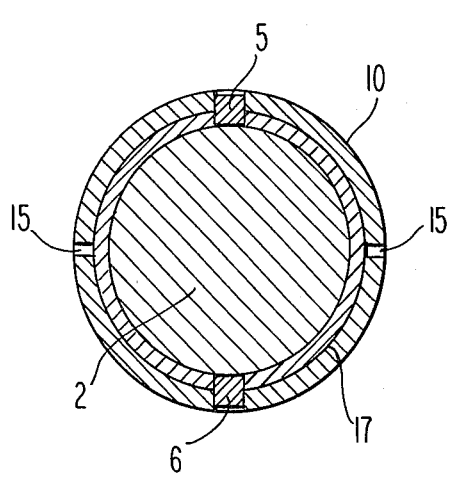
FIG. 3 is a sectional view taken along line 3—3 of FIG. 1.

The value of the resiliency slots to the rotational stop means can best be described by referring to FIG. 3, where an alternative embodiment of the wedge rings of FIG. 2 is shown. In the embodiment of FIG. 3, the inner wedge ring 17 having no resiliency slots is substituted for the inner wedge ring 9 of FIG. 2. All other parts illustrated are the same as in FIGS. 1 and 2.

When the clamping device of FIG. 3 is first placed in the annular space between hub 1 and shaft 2, the rings are in a relaxed position. Upon pressing the wedge rings together, to complete the installation, the inner wedge ring 17 is contracted and the outer wedge ring 10 is expanded. This action can result in two occurrences. First, the inner ring 17 squeezes the rotational stop members 5 and 6 sufficiently tight to prevent backlash under reversal loading applications. However, if it becomes tight before complete contraction of the inner wedge ring 17, it becomes much more difficult to further contract the inner ring 17. Second, the outer ring 10 expands and can open up the rotational stop slots 12, thus providing a loose fit between the rotational stop members 5 and 6 and the outer wedge ring 10. The loose fit results in backlash in reversal load applications and is unacceptable for applications requiring accurate timing.

By special design, the advantage provided by the closing of the rotational stop slots in the inner wedge ring 17 when it is contracted can be utilized and the disadvantage can be eliminated. The clearance between the inner wedge ring 17 and the shaft diameter is determined and multiplied by pi. This gives the amount of closing of the rotational stop slots which will occur when the inner wedge ring 17 is contracted. The width of the rotational stop slots is then designed to be larger than the width of each rotational stop member by this amount divided by the total number of rotational stop slots. In determining the clearance, the minimum value within the tolerances of shaft and ring is used.

The above described design is particularly for use with solid inner wedge rings, where very little contraction will occur. By the use of resiliency slots, such as shown in FIG. 2, the radial flexibility of the inner ring can be greatly increased and it is not necessary to provide any additional width in the rotational stop slots.

The design of the outer wedge ring 10 presents a different problem. The rotational stop slots 12 tend to spread when the rings 10 and 17 are brought into engagement, which cannot be permitted if backlash is to be eliminated. Therefore, the outer wedge ring 10 should be designed to be in contraction when placed in the bore of the hub 1 but before engagement of the wedge rings. The amount of pre-engagement contraction is at least equal to the expansion which will occur when the rings are engaged. Thus, the width of the rotational stop slots 12 will remain constant, and the rotational stop members 5 and 6 will remain firmly within the slots 12.

The pre-engagement contraction of the outer wedge ring 10 is provided by pressing the outer wedge ring 10 into an interference fit with the bore of the hub. This means that the outer diameter of the outer wedge ring 10 with the rotational stop members 5 and 6 in place will be larger than the bore diameter of the hub 1. The added flexibility of the resiliency slots 15 and 16 in outer wedge ring 10 is particularly beneficial in facilitating a large amount of pre-engagement contraction.

Figure 4:
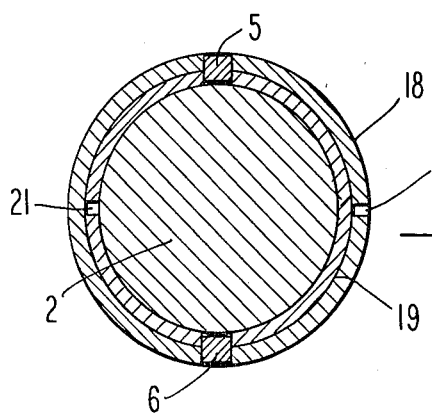
FIG. 4 is a sectional view similar to FIG. 3, but illustrating an alternative embodiment of wedge rings.

FIG. 4 illustrates an alternative embodiment of wedge rings. In FIG. 4, inner wedge ring 19 has a single resiliency slot 21, and outer wedge ring 18 also has a single resiliency slot 20. In this case, the slots 20 and 21 can extend the entire length of the wedge rings. The same special design considerations discussed with respect to FIG. 3 apply to FIG. 4 also. However, an additional consideration applies to the embodiment of FIG. 4. Ring expansion and contraction upon engagement will result in resiliency slot 20 becoming wider and resiliency slot 21 becoming narrower. In this case, only one resiliency slot exists for each ring, and therefore, there can be no balanced arrangement. Therefore, expansion and contraction of the rings is not purely radial, but the rings are subjected to circumferential displacement. That is, both of the rotational stop slots in the inner ring 19 tend to move circumferentially towards the resiliency slot 21 as that ring contracts. Both of the rotational stop slots in the outer ring 18 tend to move away from the resiliency slot 20 as that ring expands.

If the resiliency slots 21 and 20 were aligned with each other, as they are conventionally, the rotational stop slots in the inner ring 19 would move in a direction opposite that of the rotational stop slots in the outer ring 18. This results in opposite movement to each rotational stop member 5 and 6, which will jam the rotational stop member by one ring pushing the stop member one way and the other member pushing the stop member in the opposite direction. Jamming of the stop member prevents further circumferential displacement. If the rotational stop slots are wider than the stop members 5 and 6 when the rings are completely engaged, each rotational stop member 5 or 6 is functional in only one direction, the direction in which it is jammed. However, the jammed direction for one stop member happens to be opposite to that of the other stop member. The same would be true if, say four stop members were used, the two on one side of the resiliency slot would be jammed in a direction opposite to the two on the other side of the resiliency slot. This arrangement provides tight locking in both directions, preventing backlash at reversal load applications.

It is particularly advantageous to take up slop in the stop slots when they are larger than the stop members, and thus does not require the use of fitted stop members, which are those made closely to match the width of the slots.

In manner similar to that described for FIG. 3, the widths of the rotational stop slots in the embodiment of FIG. 4 can be modified to be larger or smaller to compensate for the expansion or contraction in the wedge rings. The positioning of the rotational stop slots can also be modified so that mating slots in the inner and outer rings do not align with each other when the rings are relaxed, but are designed to align when the rings are engaged. This arrangement is beneficial when stop members fit tightly in the stop slots before engagement.

A further modification is illustrated in FIG. 4. The resiliency slot 20 of outer ring 18 is positioned opposite from the resiliency slot 21 of the inner ring 19. Thus, expansion of outer ring 18 moves the rotational stop slots of the outer ring 18 in the same direction as contraction of inner ring 19 moves the rotational stop slots of the inner ring. With this arrangement, the need for the modifications described above can be minimized, and by proper selection of clearances between the inner wedge ring 19 and the shaft 2 and between the outer wedge ring 18 and the hub 1 to provide equal expansion and contraction, the modifications described above can be left out. However, where expansion of the outer ring is not equal to contraction of the inner ring, due to unequal clearances, there will be a tendency to jam the stop members in the same manner described above, although to a lesser extent. Again, this tendency can be advantageously used to eliminate backlash. It should be noted that the foregoing considerations also apply to embodiments where each ring has more than one resiliency slot, but where they are positioned in an unbalanced arrangement.

The preceding embodiments can be modified to include more than two ring sectors and corresponding rotational stops. All of the preceeding considerations would also apply to wedge rings with more than two sectors. However, the rotational stop slot width expansion and contraction considerations discussed with respect to FIGS. 3 and 4 would be adjusted to be divided over the total number of rotational stops, rather than just two.

Figure 5:
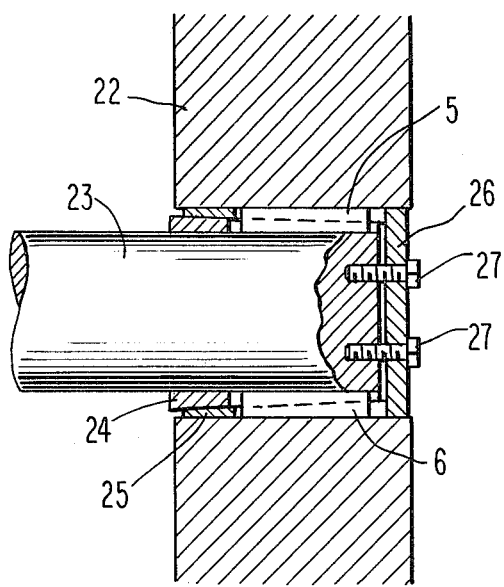
FIG. 5 is a sectional view of an embodiment of the clamping device of the invention like that illustrated in FIG. 1, but installed through use of shaft attachment means.

An alternative axial force engagement means is illustrated in FIG. 5. Flange 26 fits into the bore of hub 22 and engages the end of outer wedge ring 25 to force it into engagement with inner ring 24. A plurality of screws 27 pass through holes in flange 26 and into corresponding tapped and threaded holes in the end of shaft 23. Stop means 5 and 6 like those in FIG. 1 are placed in rotational stop slots in both inner ring 24 and outer ring 25. The actual design of the wedge rings for the embodiment of FIG. 5 can be like any of those disclosed and described with respect to FIGS. 2, 3, and 4. However, if the wedge rings of FIG. 2 are to be used in FIG. 5, the webs at the end of the rotational stop slots 11 and 12 should be on the other end of each, as shown in FIG. 5, to hold the stop members 5 and 6 in place until engagement is made. In other words, this arrangement has reverse direction of wedge inclination in respect to the location of the loading flanges and the outer wedge is pushed for engagement rather than pulled, as in FIG. 1.

Figure 6:
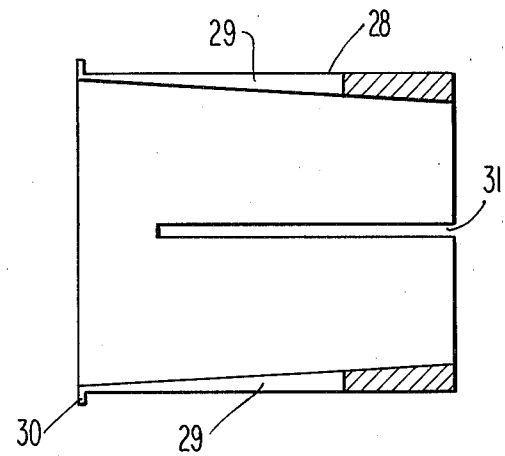
FIG. 6 is a sectional view of an alternative embodiment of an outer wedge ring useful in the hub attachment arrangement of FIG. 1.

FIG. 6 illustrates an alternative outer wedge ring 28 for use in the arrangement of FIG. 1. The ring 28 has rotational stop slots 29 like other embodiments and a resiliency slot 31 in between each rotational stop slot 29. It differs from the earlier described outer wedge rings by having a lip 30 which engages the end of the hub just outside of the bore. Lip 30 helps hold the outer ring 28 in place in the hub when beginning engagement of the wedge rings and until outer ring 28 is sufficiently expanded against the bore of hub 1 to permit self-locking to occur. Use of lip 30 permits a clearance between the outer wedge ring and the hub bore and eliminates the necessity of a snug (springing) fit in the hub bore needed for initiation of self-locking.

Figure 7:
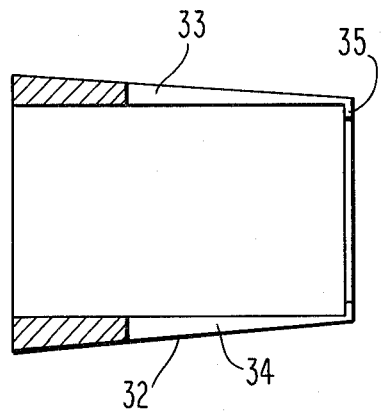
FIG. 7 is a sectional view of an alternative embodiment of an inner wedge ring useful in the shaft attachment arrangement of FIG. 5.

FIG. 7 illustrates an alternative inner wedge ring 32 for use in the arrangement illustrated in FIG. 5. It has a lip 35 extending inwardly for placement against the end of the shaft 23 to hold the inner ring 32 in place on the shaft until sufficient engagement of the wedge rings occurs to provide self-locking. The advantages of the embodiment of FIG. 7 are similar to those of the embodiment of FIG. 6.

Figure 8:
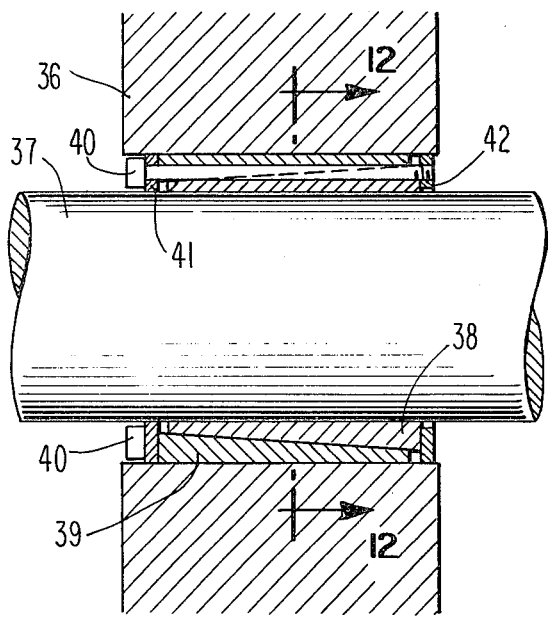
FIG. 8 is a preferred embodiment of the clamping device of the invention shown installed in the hub bore mounted on a shaft, which embodiment employs a plurality of bolts to provide both the axial force means necessary to secure the clamping device to the hub and shaft and the rotational stop members.

FIG. 8 illustrates the preferred embodiment of the invention in which the axial force engagement means also performs the function of the rotational stop means. A hub 36 is mounted on a shaft 37 through use of the clamping device of the invention. The clamping device includes inner wedge ring 38 and outer wedge ring 39 forced together into engagement by the plurality of bolts 40 which when tightened pull flanges 41 and 42 towards each other. The bolts 40 are positioned in a balanced arrangement around the flange 41 so that the wedge rings will be engaged uniformly around their circumference. Each bolt 40 passes through a circular hole in the flange 41, through a pair of mating semi-circular grooves in the wedge rings 38 and 39, and into a threaded hole in the other flange 42. One flange engages the thicker end of one wedge ring, and the other flange engages the thicker end of the other wedge ring so that pulling the two flanges towards each other results in pushing the wedge rings into engagement with each other. The bolts are preferably provided by rods with threads generally only at the end to provide a solid, smooth surface in the grooves. The grooves are parallel to the cylindrical surfaces of the rings, and are therefore, slanted with respect to the tapered surfaces of the rings.

Figure 12:
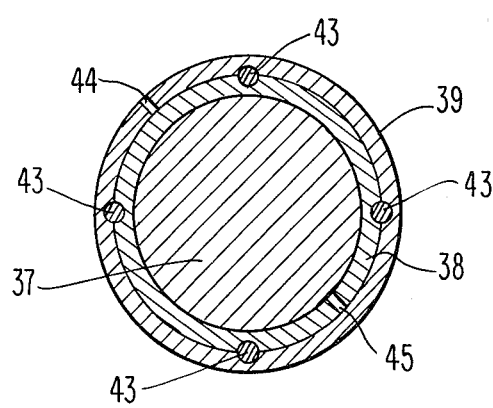
FIG. 12 is a sectional view taken along line 12—12 of FIG. 8.

FIG. 12 illustrates how the mating semi-circular grooves in the wedge rings 38 and 39 form circular holes 43 for forming the equivalent of rotational stop slots. The bolts 40 passing through the holes 43 provide the rotational stop members. The embodiment illustrated in FIG. 12 shows an arrangement with only one resiliency slot in each ring, similar to the arrangement in FIG. 4.

With the unbalanced arrangement for the resiliency slots 44 and 45 in FIG. 12, the wedge rings 38 and 39 are subjected to circumferential displacement when expanded and contracted. As in the embodiment of FIG. 4, the circumferential displacement tends to cause jamming of the bolts 40 in the holes 43. Such jamming provides the advantage of eliminating backlash, but it can interfere with further tightening of the bolts if jamming occurs before engagement of the rings is substantially complete. Therefore, it is desirable to provide holes 43 which are larger than the bolts by the amount of circumferential displacement to be expected between mating grooves forming a hole 43. The amount of circumferential displacement to be expected is determined in the same manner described for the embodiment of FIG. 4. However, the displacement will vary from hole 43 to hole 43, depending upon how far the hole is from the resiliency slot 44 or 45.

Figure 9:
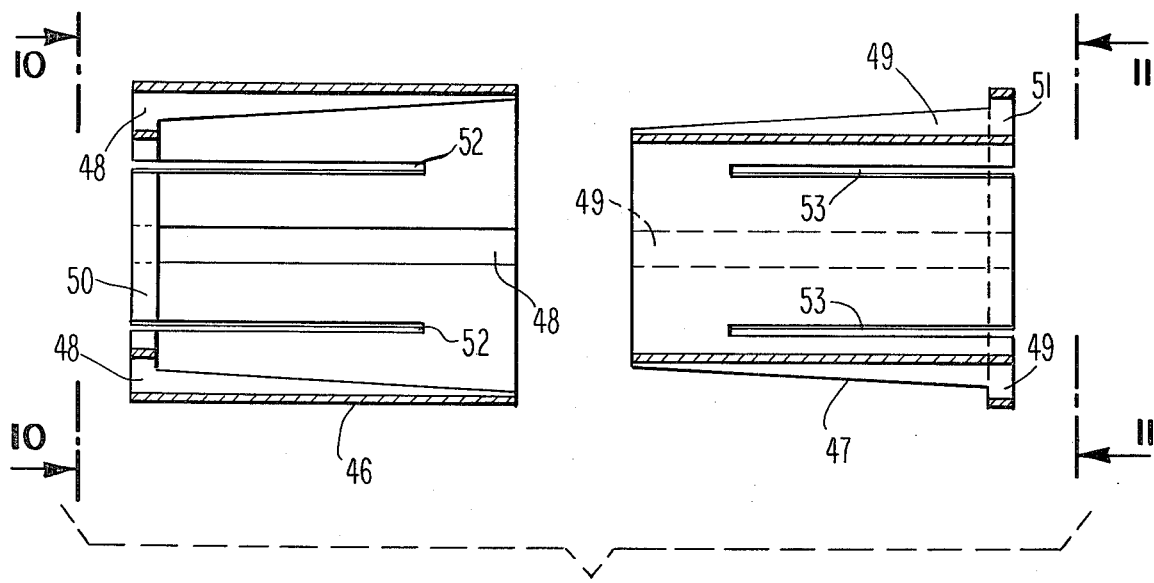
FIG. 9 is an exploded sectional view of an alternative embodiment of wedge rings useful in the clamping device illustrated in FIG. 8.
Figure 10:
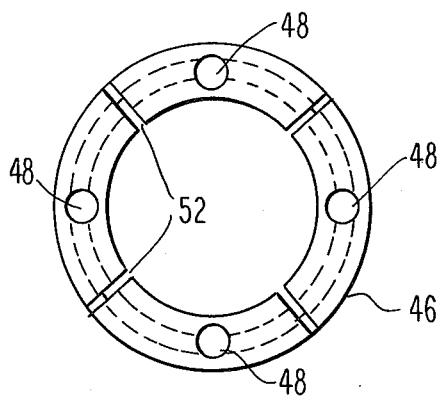
FIG. 10 is an end view of the outer wedge ring illustrated in FIG. 9, taken along line 10—10.
Figure 11:
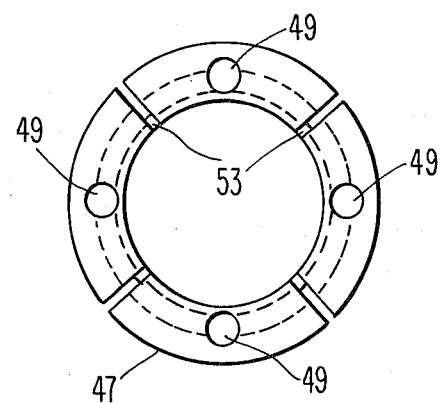
FIG. 11 is an end view of the inner wedge ring illustrated in FIG. 9, taken along line 11—11.

FIGS. 9, 10, and 11 illustrate the preferred embodiment of wedge rings to be used in the clamping arrangement of FIG. 8. Outer wedge ring 46 and inner wedge ring 47 each have semi-circular grooves forming holes 48 and 49, respectively, which provide rotational stop slots. Outer ring 46 has an integral inwardly extending flange extension 50. Inner wedge ring 47 has an integral outwardly extending flange extension 51. The semi-circular grooves 48 and 49 extend through the extensions 50 and 51 in the form of circular holes through which bolts 40 pass. The holes in one of the extensions can be threaded to engage the bolts, or additional nuts can be employed. Resiliency slots 52 and 53 are cut most of the length of the wedge rings 46 and 47 in positions between the bolt holes and grooves 48 and 49 in a balanced arrangement. This arrangement of the resiliency slots permits pure radial contraction and expansion of the wedge rings without circumferential displacement of the rings.

Having resiliency slots in a balanced arrangement avoids the jamming which occurs in the embodiment of FIG. 12. Therefore, it is permissible and preferable to use fitted bolts in the embodiment which expands and contracts purely radially. Fitted bolts are sized to fit snugly into the holes 48 before engagement, so that backlash is eliminated. Pure radial expansion and contraction also occurs with solid rings (those having no resiliency slots), and it is preferable to employ fitted bolts in that design also.

The clamping device of the invention is preferably made from strong materials, such as metals, which are easily machined or formed by other methods. The tapered wedge surfaces of the wedge rings are coated, preferably on both of them, with a stable dry anti-friction material, preferably Teflon composition. The bolts employed in the embodiment of FIGS. 8–12 are small enough to fit into the annular space between a hub and shaft, and therefore, are preferably made of high tensile strength materials, such as heat treated steel and alloys, having a tensile strength of at least 50,000 p.s.i.

What is claimed is:

1. In a clamping device for keyless mounting of a hub on a shaft, which comprises a nesting pair of radially flexible wedge rings for placement within the annular space between the hub bore and the shaft and axial force means for forcing the wedge rings into nesting engagement to thereby radially expand one of the wedge rings and radially contract the other wedge ring, the pair of wedge rings being provided by an inner wedge ring having a cylindrical inner surface for gripping the shaft when contracted and an outer wedge ring having a cylindrical outer surface for gripping the bore surface of the hub when expanded, the inner wedge ring having an outer annular surface and the outer wedge ring having an inner annular surface with matching, shallow-angle axial tapers from 2° to 10° for nesting the inner wedge ring within the outer wedge ring and at least one of the matching tapered surfaces having coated thereon a stable dry antifriction material preventing metal-to-metal contact, the angle of the matching tapered surfaces and the coeficients of friction of the annular surfaces of the wedge rings providing self-locking and self centering characteristics, the improvement comprising each of the inner and outer wedge rings being provided by an equal number of a plurality of circumferential sectors with each sector of the inner wedge ring aligning circumferentially with a sector of the outer wedge ring, the circumferential sectors in each wedge ring being separated from each adjacent circumferential sector by a rotational stop slot of predetermined width extending axially through each wedge ring for a predetermined length less than the length of the wedge ring to provide a web interconnecting adjacent circumferential sectors with the strength capability to transmit the force acting between adjacent sectors, and each pair of aligned sectors being separated from the adjacent pair of aligned sectors by a common member of a plurality of rotational stop members positioned in aligned stop slots, whereby each circumferential sector transmits only part of the rotational force between the wedge rings to thereby provide maximum rotational securement of the hub to the shaft and substantially reduced circumferential deflection of the wedge rings under load.

2. The improved clamping device of claims 1, wherein the wedge rings expand and contract radially with no circumferential displacement of the rotational stop slots.

3. The improved clamping device of claim 2, wherein the width of the rotational stop slots in at least one of the wedge rings is substantially equal to the width of the rotational stop members in the slots to thereby prevent backlash at reversal loading.

4. In a clamping device for keyless mounting of a hub on a shaft, which comprises a nesting pair of radially flexible wedge rings for placement within the annular space between the hub bore and the shaft and axial force means for forcing the wedge rings into nesting engagement to thereby radially expand one of the wedge rings and radially contract the other wedge ring, the pair of wedge rings being provided by an inner wedge ring having a cylindrical inner surface for gripping the shaft when contracted and an outer wedge ring having a cylindrical outer surface for gripping the bore surface when expanded, the inner wedge ring having an outer annular surface and the outer wedge ring having an inner annular surface with matching shallow-angle axial tapers from 2° to 10° for nesting the inner wedge ring within the outer wedge ring and at least one of the matching tapered surfaces having coated thereon a stable dry anti-friction material preventing metal-to-metal contact, the angle of the matching tapered surfaces and the coefficients of friction of the annular surfaces of the wedge rings providing self-locking and self centering characteristics, the improvement wherein the axial force means also provides rotational stop means for preventing rotation of one wedge ring with respect to the other wedge ring and comprises a plurality of bolts, threaded means associated with the bolts, and an opening for each bolt formed by a pair of aligned axial grooves in the matching tapered surfaces of the wedge rings, each bolt passing through one of the openings to force the wedge rings into engagement in response to tightening the bolts in the threaded means, the axial grooves in the tapered surfaces of each wedge ring having a predetermined width and depth and separate each wedge ring into a plurality of circumferential sectors, whereby each circumferential sector transmits only part of the rotational force between the wedge rings to thereby provide maximum rotational securement of the hub to the shaft and substantially reduced circumferential deflection of the wedge rings under load, and the remainder of the wedge ring wall at the groove is sufficient in size to interconnect adjacent circumferential sectors with the strength capability to transmit the force acting between adjacent sectors, and the bolts and axial grooves are adapted for a snug fit between the bolts and axial grooves of the wedge rings when the wedge rings are completely engaged within the annular space between the hub bore and the shaft.

5. The improved clamping device of claim 4, wherein the wedge rings expand and contract radially with no circumferential displacement of the axial grooves, and the bolts are substantially the same size as the bolt openings before and after engagement of the rings.

6. The improved clamping device of claims 1 or 4, wherein each of the inner and outer wedge rings has one or more resiliency slots in an unbalanced arrangement which causes circumferential displacement of the rotational stop slots or axial grooves in each ring upon expansion and contraction of the wedge ring, to provide a firm fit of the rotational stop members in their respective rotational stop slots or axial grooves and thereby prevent backlash at reversal loading.

7. The improved clamping device of claim 4, wherein the inner and outer wedge rings consist essentially of a single pair of wedge rings.

8. The improved clamping device of claim 4, wherein the axial force means fits entirely within the annular space between the hub bore and the shaft.

9. The improved clamping device of claim 8, wherein the axial force means includes a first annular shaped flange membered associated with the thicker end of the inner wedge ring and a second annular shaped flange member associated with the thicker end of the outer wedge ring, each of the flange members having a plurality of openings into which the bolts extend.

10. The improved clamping device of claim 9, wherein each flange member is separate from its respective associated wedge ring.

11. The improved clamping device of claim 9, wherein at least one of the flange members is integral with its respective associated wedge ring.

12. The improved clamping device of claim 4, wherein the bolts are provided by rods with threads only at the end to provide a solid, smooth surface in the grooves.

13. The improved clamping device of claims 1 or 4, wherein the angle of the matching tapered surfaces and the coeficient of friction between them provides self-releasing characteristics.

14. In a clamping device for keyless mounting of a hub on a shaft, which comprises a nesting pair of radially flexible wedge rings for placement within the annular space between the hub bore and the shaft and axial force means for forcing the wedge rings into nesting engagement to thereby radially expand one of the wedge rings and radially contract the other wedge ring, the pair of wedge rings being provided by an inner wedge ring having a cylindrical inner surface for gripping the shaft when contracted and an outer wedge ring having a cylindrical outer surface for gripping the bore surface when expanded, the inner wedge ring having an outer annular surface and the outer wedge ring having an inner annular surface with matching shallow-angle tapers from 2° to 10° for nesting the inner wedge ring within the outer wedge ring and at least one of the matching tapered surfaces having coated thereon a stable dry anti-friction material preventing metal-to-metal contact, the angle of the matching tapered surfaces and the coefficients of friction of the annular surfaces of the wedge rings providing self-locking and self centering characteristics, the improvement wherein the axial force means also provides rotational stop means for preventing rotation of one wedge ring with respect to the other wedge ring and comprises a plurality of bolts, threaded means associated with the bolts, and an opening for each bolt formed by a pair of aligned axial grooves in the matching tapered surfaces of the wedge rings, each bolt passing through one of the openings to force the wedge rings into engagement in response to tightening the bolts in the threaded means, the axial grooves in the tapered surfaces of each wedge ring having a predetermined width and depth and separate each wedge ring into a plurality of circumferential sectors, whereby each circumferential sector transmits only part of the rotational force between the wedge rings to thereby provide maximum rotational securement of the hub to the shaft and substantially reduced circumferential deflection of the wedge rings under load, and the remainder of the wedge ring wall at the groove is sufficient in size to interconnect adjacent circumferential sectors with the strength capability to transmit the force acting between adjacent sectors, and the bolts and axial grooves are adapted for a tight fit between the bolts and axial grooves of the wedge rings when the wedge rings are completely engaged within the annular space between the hub bore and the shaft, the bolts being substantially the same size as the bolt openings before and after engagement of the rings, and the outer wedge ring is provided with a plurality of resiliency slots extending part way through the axial length of the wedge ring at positions in a balanced arrangement for increasing radial flexibility of the wedge ring, and both wedge rings expand and contract radially with no circumferential displacement of the axial grooves.

15. In a clamping device for keyless mounting of a hub on a shaft, which comprises a nesting pair of radially flexible wedge rings for placement within the annular space between the hub bore and the shaft and axial force means for forcing the wedge rings into nesting engagement to thereby radially expand one of the wedge rings and radially contract the other wedge ring, the pair of wedge rings being provided by an inner wedge ring having a cylindrical inner surface for gripping the shaft when contracted and an outer wedge ring having a cylindrical outer surface for gripping the bore surface of the hub when expanded, the inner wedge ring having an outer annular surface and the outer wedge ring having an inner annular surface with matching, shallow-angle axial tapers from 2° to 10° for nesting the inner wedge ring within the outer wedge ring and at least one of the matching tapered surfaces having coated thereon a stable dry anti-friction material preventing metal-to-metal contact, the angle of the matching tapered surfaces and the coeficients of friction of the annular surfaces of the wedge rings providing self-locking and self centering characteristics, the improvement comprising each of the inner and outer wedge rings being provided by an equal number of a plurality of circumferential sectors with each sector of the inner wedge ring aligning circumferentially with a sector of the outer wedge ring, the circumferential sectors in each wedge ring being separated from each adjacent circumferential sector by a rotational stop slot of predetermined width extending axially through each wedge ring for a predetermined length less than the length of the wedge ring to provide a web interconnecting adjacent circumferential sectors with the strength capability to transmit the force acting between adjacent sectors, and each pair of aligned sectors being separated from the adjacent pair of aligned sectors by a common member of a plurality of rotational stop members positioned in aligned stop slots, whereby each circumferential sector transmits only part of the rotational force between the wedge rings to thereby provide maximum rotational securement of the hub to the shaft and substantially reduced circumferential deflection of the wedge rings under load, the wedge rings expand and contract radially with no circumferential displacement of the rotational stop slots, and the outer wedge ring is provided with a plurality of resiliency slots extending part way through the axial length of the wedge ring at positions in a balanced arrangement for increasing radial flexibility of the wedge ring.

16. The improved clamping device of claim 14 or 15, wherein the outer diameter of the relaxed outer wedge ring is larger than the hub bore diameter, and the resiliency slots are contracted when the outer wedge ring with rotational stop members is placed in the hub bore to provide a springing fit.

17. The improved clamping device of claims 14 or 15, wherein the inner wedge ring is also provided with a plurality of resiliency slots extending part way through the axial length of the wedge ring in a balanced arrangement for increasing radial flexibility of the wedge ring.

18. In a clamping device for keyless mounting of a hub on a shaft, which comprises a nesting pair of radially flexible wedge rings for placement within the annular space between the hub bore and the shaft and axial force means for forcing the wedge rings into nesting engagement to thereby radially expand one of the wedge rings and radially contract the other wedge ring, the pair of wedge rings being provided by an inner wedge ring having a cylindrical inner surface for gripping the shaft when contracted and an outer wedge ring having a cylindrical outer surface for gripping the bore surface of the hub when expanded, the inner wedge ring having an outer annular surface and the outer wedge ring having an inner annular surface with matching, shallow-angle axial tapers from 2° to 10° for nesting the inner wedge ring within the outer wedge ring and at least one of the matching tapered surfaces having coated thereon a stable dry antifriction material preventing metal-to-metal contact, the angle of the matching tapered surfaces and the coeficients of friction of the annular surfaces of the wedge rings providing self-locking and self centering characteristics, the improvement comprising each of the inner and outer wedge rings being provided by an equal number of a plurality of circumferential sectors with each sector of the inner wedge ring aligning circumferentially with a sector of the outer wedge ring, the circumferential sectors in each wedge ring being separated from each adjacent circumferential sector by a rotational stop slot of predetermined width extending axially through each wedge ring for a predetermined length less than the length of the wedge ring to provide a web interconnecting adjacent circumferential sectors with the strength capability to transmit the force acting between adjacent sectors, and each pair of aligned sectors being separated from the adjacent pair of aligned sectors by a common member of a plurality of rotational stop members positioned in aligned stop slots, whereby each circumferential sector transmits only part of the rotational force between the wedge rings to thereby provide maximum rotational securement of the hub to the shaft and substantially reduced circumferential deflection of the wedge rings under load, each of the inner and outer wedge rings has one or more resiliency slots in an unbalanced arrangement which causes circumferential displacement of the rotational stop slots in each ring upon expansion and contraction of the wedge rings, to provide a firm fit of the rotational stop members in their respective rotational stop slots, and the rotational stop slots of the relaxed inner wedge ring are positioned offset from the rotational stop slots of the relaxed outer wedge ring by a predetermined circumferential distance proportional to the circumferential displacement of the rotational stop slots upon complete engagement of the wedge rings in the annular space between the hub bore and the shaft to prevent excessive binding of the rotational stop members before complete engagement of the wedge rings.

19. In a clamping device for keyless mounting of a hub on a shaft, which comprises a nesting pair of radially flexible wedge rings for placement within the annular space between the hub bore and the shaft and axial force means for forcing the wedge rings into nesting engagement to thereby radially expand one of the wedge rings and radially contract the other wedge ring, the pair of wedge rings being provided by an inner wedge ring having a cylindrical inner surface for gripping the shaft when contracted and an outer wedge ring having a cylindrical outer surface for gripping the bore surface when expanded, the inner wedge ring having an outer annular surface and the outer wedge ring having an inner annular surface with matching shallow-angle tapers from 2° to 10° for nesting the inner wedge ring within the outer wedge ring and at least one of the matching tapered surfaces having coated thereon a stable dry anti-friction material preventing metal-to-metal contact, the angle of the matching tapered surfaces and the coefficients of friction of the annular surfaces of the wedge rings providing self-locking and self centering characteristics, the improvement wherein the axial force means also provides rotational stop means for preventing rotation of one wedge ring with respect to the other wedge ring and comprises a plurality of bots, threaded means associated with the bolts, and an opening for each bolt formed by a pair of aligned axial grooves in the matching tapered surfaces of the wedge rings, each bolt passing through one of the openings to force the wedge rings into engagement in response to tightening the bolts in the threaded means, the axial grooves in the tapered surfaces of each wedge ring having a predetermined width and depth and separate each wedge ring into a plurality of circumferential sectors, whereby each circumferential sector transmits only part of the rotational force between the wedge rings to thereby provide maximum rotational securement of the hub to the shaft and substantially reduced circumferential deflection of the wedge rings under load, and the remainder of the wedge ring wall at the groove is sufficient in size to interconnect adjacent circumferential sectors with the strength capability to transmit the force acting between adjacent sectors, and the bolts and axial grooves are adapted for a tight fit between the bolts and axial grooves of the wedge rings when the wedge rings are completely engaged within the annular space between the hub bore and the shaft, each of the inner and outer wedge rings has one or more resiliency slots in an unbalanced arrangement which causes circumferential displacement of the axial grooves in each ring upon expansion and contraction of the wedge rings, to provide a firm fit of the rotational stop members in their respective axial grooves, and the axial grooves of the relaxed inner wedge ring are positioned offset from the axial grooves of the relaxed outer wedge ring by a predetermined circumferential distance proportional to the circumferential displacement of the axial grooves upon complete engagement of the wedge rings in the annular space between the hub bore and the shaft to prevent excessive binding of the bolts before complete engagement of the wedge rings.

20. In a clamping device for keyless mounting of a hub on a shaft, which comprises a nesting pair of radially flexible wedge rings for placement within the annular space between the hub bore and the shaft and axial force means for forcing the wedge rings into nesting engagement to thereby radially expand one of the wedge rings and radially contract the other wedge ring, the pair of wedge rings being provided by an inner wedge ring having a cylindrical inner surface for gripping the shaft when contracted and an outer wedge ring having a cylindrical outer surface for gripping the bore surface of the hub when expanded, the inner wedge ring having an outer annular surface and the outer wedge ring having an inner annular surface with matching shallow-angle axial tapers from 2° to 10° for nesting the inner wedge ring within the outer wedge ring and at least one of the matching tapered surfaces having coated thereon a stable dry antifriction material preventing metal-to-metal contact, the angle of the matching tapered surfaces of the wedge rings providing self-locking and self centering characteristics, the improvement comprising each of the inner and outer wedge rings being provided by an equal number of a plurality of circumferential sectors with each sector of the inner wedge ring aligning circumferentially with a sector of the outer wedge ring, the circumferential sectors in each wedge ring being separated from each adjacent circumferential sector by a rotational stop slot of predetermined width extending axially through each wedge ring for a predetermined length less than the length of the wedge ring to provide a web interconnecting adjacent circumferential sectors with the strength capability to transmit the force acting between adjacent sectors, and each pair of aligned sectors being separated from the adjacent pair of aligned sectors by a common member of a plurality of rotational stop members positioned in aligned stop slots, whereby each circumferential sector transmits only part of the rotational force between the wedge rings to thereby provide maximum rotational securement of the hub to the shaft and substantially reduced circumferential deflection of the wedge rings under load, each of the inner and outer wedge rings has only one resiliency slot in an unbalanced arrangement which causes circumferential displacement of the rotational stop slots in each ring upon expansion and contraction of the wedge rings, to provide a firm fit of the rotational stop members in their respective rotational stop slots, and the resiliency slot of each wedge ring extends all of the way through the axial length of the wedge ring and is positioned opposite circumferentially from the resiliency slot of the other wedge ring to cause the circumferential displacement of each pair of aligned rotational stop slots in the inner and outer wedge rings to be in the same direction to reduce the size of or to eliminate the need for the predetermined circumferential offset distance of the rotational stop slots of the relaxed inner wedge ring from those of the relaxed outer wedge ring to prevent excessive binding of the rotational stop members before complete engagement of the wedge rings.

21. In a clamping device for keyless mounting of a hub on a shaft, which comprises a nesting pair of radially flexible wedge rings for placement within the annular space between the hub bore and the shaft and axial force means for forcing the wedge rings into nesting engagement to thereby radially expand one of the wedge rings and radially contract the other wedge ring, the pair of wedge rings being provided by an inner wedge ring having a cylindrical inner surface for gripping the shaft when contracted and an outer wedge ring having a cylindrical outer surface for gripping the bore surface when expanded, the inner wedge ring having an outer annular surface and the outer wedge ring having an inner annular surface with matching shallow-angle tapers from 2° to 10° for nesting the inner wedge ring within the outer wedge ring and at least one of the matching tapered surfaces having coated thereon a stable dry anti-friction material preventing metal-to-metal contact, the angle of the matching tapered surfaces and the coefficients of friction of the annular surfaces of the wedge rings providing self-locking and self centering characteristics, the improvement wherein the axial force means also provides rotational stop means for preventing rotation of one wedge ring with respect to the other wedge ring and comprises a plurality of bolts, threaded means associated with the bolts, and an opening for each bolt formed by a pair of aligned axial grooves in the matching tapered surfaces of the wedge rings, each bolt passing through one of the openings to force the wedge rings into engagement in response to tightening the bolts in the threaded means, the axial grooves in the tapered surfaces of each wedge ring having a predetermined width and depth and separate each wedge ring into a plurality of circumferential sectors, whereby each circumferential sector transmits only part of the rotational force between the wedge rings to thereby provide maximum rotational securement of the hub to the shaft and substantially reduced circumferential deflection of the wedge rings under load, and the remainder of the wedge ring wall at the groove is sufficient in size to interconnect adjacent circumferential sectors with strength capability to transmit the force acting between adjacent sectors, and the bolts and axial grooves are adapted for a tight fit between the bolts and axial grooves of the wedge rings when the wedge rings are completely engaged within the annular space between the hub bore and the shaft, each of the inner and outer wedge rings has only one resiliency slot in an unbalanced arrangement which causes circumferential displacement of the axial grooves in each ring upon expansion and contraction of the wedge rings, to provide a firm fit of the bolts in their respective axial grooves, and the resiliency slot of each wedge ring extends all of the way through the axial length of the wedge ring and is positioned opposite circumferentially from the resiliency slot of the other wedge ring to cause the circumferential displacement of each pair of aligned axial grooves in the inner and outer wedge rings to be in the same direction to reduce the size of or to eliminate the need for the predetermined circumferential offset distance of the axial grooves of the relaxed inner wedge ring from those of the relaxed outer wedge ring to prevent excessive binding of the bolts before complete engagement of the wedge rings.

22. In a clamping device for keyless mounting of a hub on a shaft, which comprises a nesting pair of radially flexible wedge rings for placement within the annular space between the hub bore and the shaft and axial force means for forcing the wedge rings into nesting engagement to thereby radially expand one of the wedge rings and radially contract the other wedge ring, the pair of wedge rings being provided by an inner wedge ring having a cylindrical inner surface for gripping the shaft when contracted and an outer wedge ring having a cylindrical outer surface for gripping the bore surface of the hub when expanded, the inner wedge ring having an outer annular surface and the outer wedge ring having an inner annular surface with matching, shallow-angle axial tapers from 2° to 10° for nesting the inner wedge ring within the outer wedge ring and at least one of the matching tapered surfaces having coated thereon a stable dry antifriction material preventing metal-to-metal contact, the angle of the matching tapered surfaces and the coeficients of friction of the annular surfaces of the wedge rings providing self-locking and self centering characteristics, the improvement comprising each of the inner and outer wedge rings being provided by an equal number of a plurality of circumferential sectors with each sector of the inner wedge ring aligning circumferentially with a sector of the outer wedge ring, and each pair of aligned sectors being separated from the adjacent pair of aligned sectors by a common member of a plurality of rotational stop members, whereby each circumferential sector transmits only part of the rotational force between the wedge rings to thereby provide maximum rotational securement of the hub to the shaft and substantially reduced circumferential deflection of the wedge rings under load, and the axial force means are provided by a flange member which fits against the thicker end of one of the wedge rings and has a circular opening through which the shaft extends and a plurality of screws which extend through holes in the flange member and engage corresponding threaded holes in the end of the hub when tightening the screws and thereby forcing the flange member toward the hub and one of the wedge rings into engagement with the other wedge ring.

23. The improved clamping device of claim 22, wherein the outer wedge ring has a lip extending outwardly from the thinner end of the wedge ring for placement against the end of the hub to hold the outer wedge ring in position until the outer ring is sufficiently expanded against the hub to enable self-locking to occur.

24. In a clamping device for keyless mounting of a hub on a shaft, which comprises a nesting pair of radially flexible wedge rings for placement within the annular space between the hub bore and the shaft and axial force means for forcing the wedge rings into nesting engagement to thereby radially expand one of the wedge rings and radially contract the other wedge ring, the pair of wedge rings being provided by an inner wedge ring having a cylindrical inner surface for gripping the shaft when contracted and an outer wedge ring having a cylindrical outer surface for gripping the bore surface of the hub when expanded, the inner wedge ring having an outer annular surface and the outer wedge ring having an inner annular surface with matching, shallow-angle axial tapers from 2° to 10° for nesting the inner wedge ring within the outer wedge ring and at least one of the matching tapered surfaces having coated thereon a stable dry antifriction material preventing metal-to-metal contact, the angle of the matching tapered surfaces and the coeficients of friction of the annular surfaces of the wedge rings providing self-locking and self centering characteristics, the improvement comprising each of the inner and outer wedge rings being provided by an equal number of a plurality of circumferential sectors with each sector of the inner wedge ring aligning circumferentially with a sector of the outer wedge ring, and each pair of aligned sectors being separated from the adjacent pair of aligned sectors by a common member of a plurality of rotational stop members, whereby each circumferential sector transmits only part of the rotational force between the wedge rings to thereby provide maximum rotational securement of the hub to the shaft and substantially reduced circumferential deflection of the wedge rings under load, and the axial force means are provided by a flange member which fits against the thicker end of one of the wedge rings and a plurality of screws which extend through holes in the flange member and engage corresponding threaded holes in the end of the shaft for forcing the flange towards the end of the shaft when tightening the screws and thereby forcing one of the wedge rings into engagement with the other wedge ring.

25. The improved clamping device according to claim 24, wherein the inner wedge ring has a lip extending inwardly from the thinner end of the inner wedge ring for placement against the end of the shaft to hold the inner wedge ring in position until it is sufficiently contracted to enable self-locking to occur.

* * * * *